United States Patent [19]
Höhle

[11] Patent Number: 5,525,221
[45] Date of Patent: Jun. 11, 1996

[54] STERILE FILTRATION CANDLE FILTER FOR SUSPENSIONS

[75] Inventor: Glenn Höhle, Uetikon, Switzerland

[73] Assignee: Dr.M, Dr,Müller AG., Männedorf, Switzerland

[21] Appl. No.: 360,661

[22] PCT Filed: Apr. 12, 1994

[86] PCT No.: PCT/CH94/00073
§ 371 Date: Dec. 19, 1994
§ 102(e) Date: Dec. 19, 1994

[87] PCT Pub. No.: WO94/23819
PCT Pub. Date: Oct. 27, 1994

[30] Foreign Application Priority Data
Apr. 19, 1993 [CH] Switzerland ............. 1187/93

[51] Int. Cl.⁶ .................................................. B01D 29/17
[52] U.S. Cl. .................... 210/323.2; 210/346; 210/437; 210/486
[58] Field of Search ................ 210/232, 323.2, 210/330, 331, 346, 357, 437, 438, 452, 457, 486

[56] References Cited

U.S. PATENT DOCUMENTS 3,945,923  3/1976  Rogers et al. .................. 210/323.2
4,402,828  9/1983  Edens ............................. 210/323.2
5,298,159  3/1994  Peterman ........................ 210/323.2

FOREIGN PATENT DOCUMENTS 0066921  12/1982  European Pat. Off. ..
0070589  1/1983   European Pat. Off. ..
0155336  9/1985   European Pat. Off. ..
8714943  3/1988   Germany .

OTHER PUBLICATIONS

The Random House College Dictionary, Revised Edition, p. 501.

*Primary Examiner*—W. L. Walker
*Attorney, Agent, or Firm*—Michael J. Striker

[57] ABSTRACT

A filter for sterile filtration of suspensions, comprising a pressure vessel, at least one candle filter element arranged in the pressure vessel, the at least one filter element having a hollow member with a lower portion which is formed as a filtering medium and an upper portion which is formed as a closed tube with an unwrapped self-supporting filtering medium, and a tube for carrying off a filtrate, the tube being formed as a central tube which is arranged in the hollow member and the filtering medium and is removable so as to permit inspection and cleaning of the filter element without opening the pressure vessel.

9 Claims, 3 Drawing Sheets

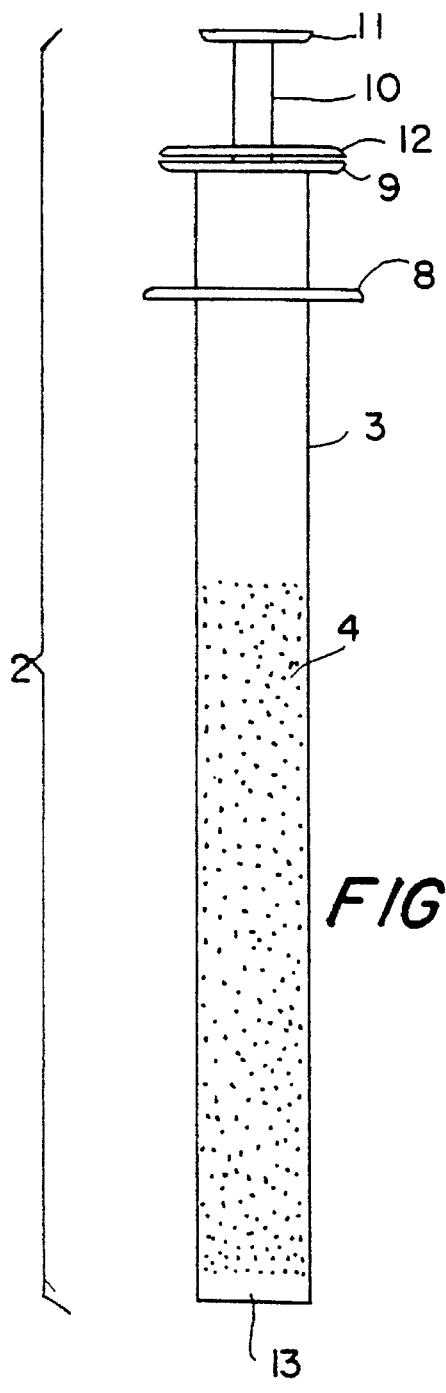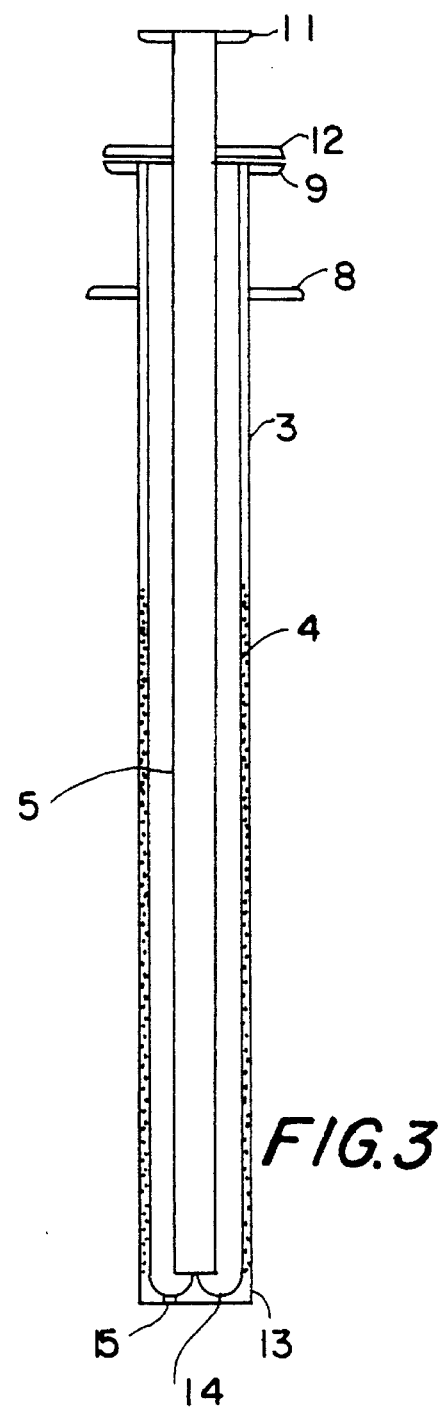

STERILE FILTRATION CANDLE FILTER FOR SUSPENSIONS

BACKGROUND OF THE INVENTION

The present invention relates to a sterile-filtration filter for suspensions.

For filtration of sterile suspensions in the pharmaceutical domain, it is absolutely necessary that all parts of a filtration device be thoroughly cleaned mechanically prior to actual sterilization, e.g., by superheated steam, to remove any adhering solids. In general, this can only be accomplished by disassembling all of the individual parts of the apparatus. In many cases, disassembling the parts of a filter unit is possible, if at all, only at great expense.

A filter device with a plurality of filter candles which are arranged so as to be suspended in a pressure vessel is known. The retaining part of the two-part filter candles on the filtrate side is substantially formed by a tube carrying the actual filtering medium in the form of a woven hose. In the known device, the filter elements are arranged one after the other so as to be suspended at removable collecting tubes through which the clear filtrate is removed (EP-A-0 070 589). A filter device of this type is well-suited in large-scale chemical operations for washing out filter cakes or suspensions, but is not suited for sterile filtration in pharmaceutical applications.

EP-A-0 066 921 discloses a filter element which is formed by a closed central tube as supporting member and serves to remove a filtrate, filtering media being arranged around the tube. Either plastic tubes or metal tubes can be used.

SUMMARY OF THE INVENTION

Accordingly, it is an object of the present invention to provide a sterile-filtration filter for suspensions, which avoids the disadvantages of the prior art.

More particularly, it is an object of the present invention to provide a filter for sterile filtration in which all parts, in particular the filter elements, can be inspected and cleaned in a simple manner.

This object is met according to the invention in that the central tube is arranged in the hollow member and filtering medium so as to be removable.

This has the advantage that the central tube is accessible to inspection and mechanical cleaning and the filter candle is also visible and accessible from the outside and can be cleaned without being removed.

A flange is advisably provided in the upper third of the hollow member or central tube. This has the advantage that the greatest possible surface of the filter element can be used as an active filter surface.

The end flange serves for fastening the hollow member at the horizontally extending effluent tube at which a plurality of filter elements can be arranged.

The free end of the hollow member is advisably provided with a sealing cap which can be designed in various ways.

The sealing cap is advantageously provided with a single or double bore so as to facilitate backblowing or backrinsing as well as cleaning and sterilization of the filter element.

In a variant, the sealing cap is provided with a bore hole which serves as a condensate runoff and can be made from sintered metal or from some other porous medium.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a filter element according to the invention in a plan view;

FIG. 3 shows the filter element according to FIG. 2 in longitudinal section;

DESCRIPTION OF THE PREFERRED EMBODIMENTS

Figure 1:
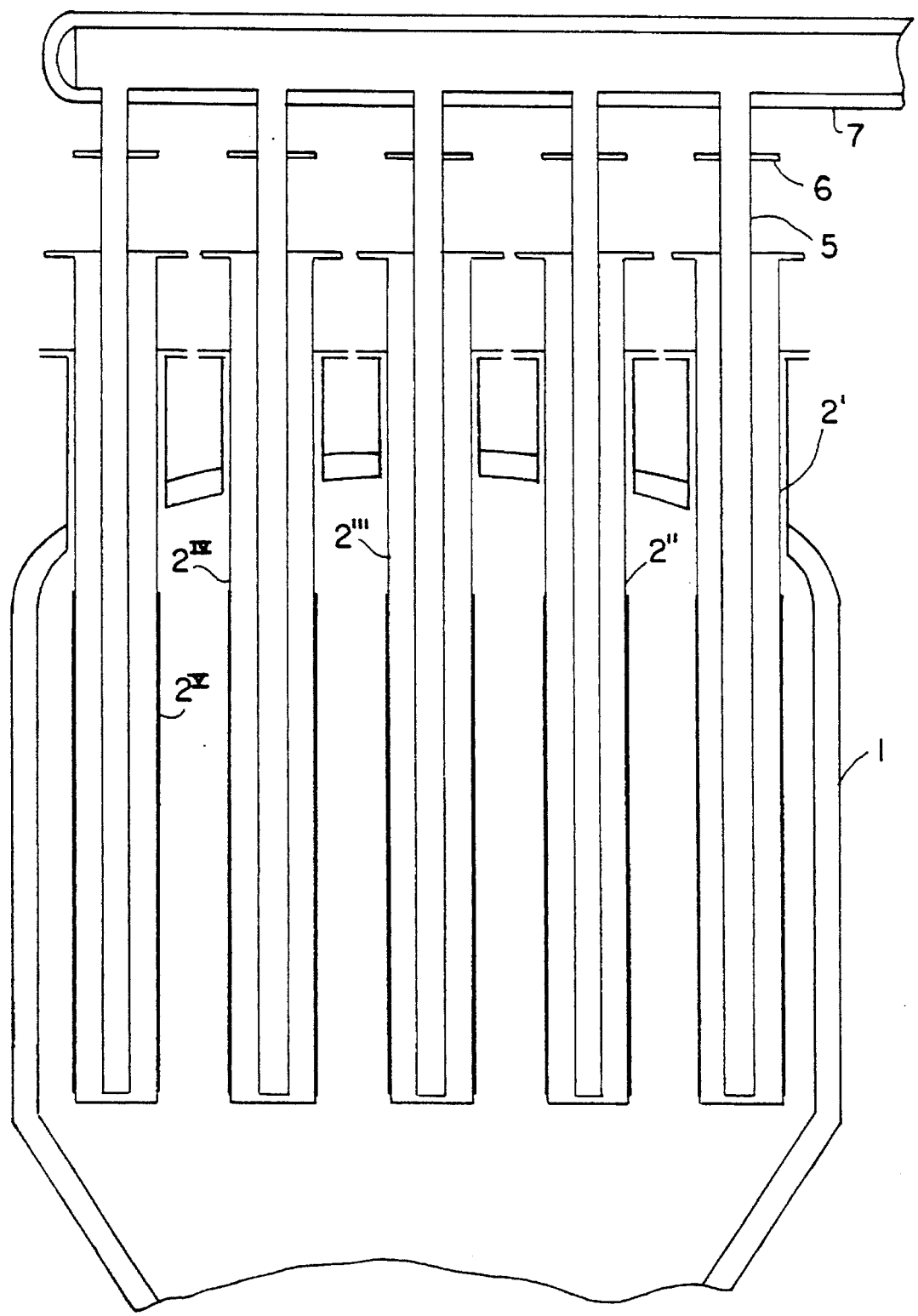
FIG. 1 shows a section through the sterile filter according to the invention.

In FIG. 1, the wall of a pressure vessel is designated by 1. Filter elements $2'$, $2''$, $2'''$, $2^{iv}$ and $2^v$ are arranged in the pressure vessel 1 in such a way that they lead through the upper part of the pressure vessel so as to be tight against liquid. Central tubes 5 which are connected with a collecting tube 7 via a flange 6 are arranged in the interior of the filter elements 2 and serve to carry off the filtrate.

FIG. 2 shows an individual filter element 2 whose upper portion is formed by a hollow member 3 and whose lower portion is formed by a self-supporting filtering medium 4. The filtering medium 4 itself can be formed by a sintered-metal candle or some other porous body which can be sterilized by steam. Perforated supporting members provided with semipermeable membranes may also be used instead of filter candles. A flange 8 and a flange 9 are provided in the hollow member 3. In the filter element 2, the upper part of a central tube 10 is outfitted with an end flange 11 and another flange 12 provided in the upper third of the central tube. The lower part of the hollow member 3 is closed by a sealing cap.

In FIG. 3, the central tube 5 extends along the entire length of the hollow member 3 and filtering medium 4. FIG. 3 differs from FIG. 2 essentially with respect to its lower portion. The sealing cap 13 is provided with a rounded bore 14. The bore 14 serves to deflect the liquid and facilitates backblowing or backrinsing as well as cleaning and sterilization of the filter element 2 by eliminating dead corners. A condensate outlet 15 constructed from sintered metal or some other porous medium is formed in the sealing cap 13 so that residual liquid may be completely emptied from the filter element 2.

Figure 4:
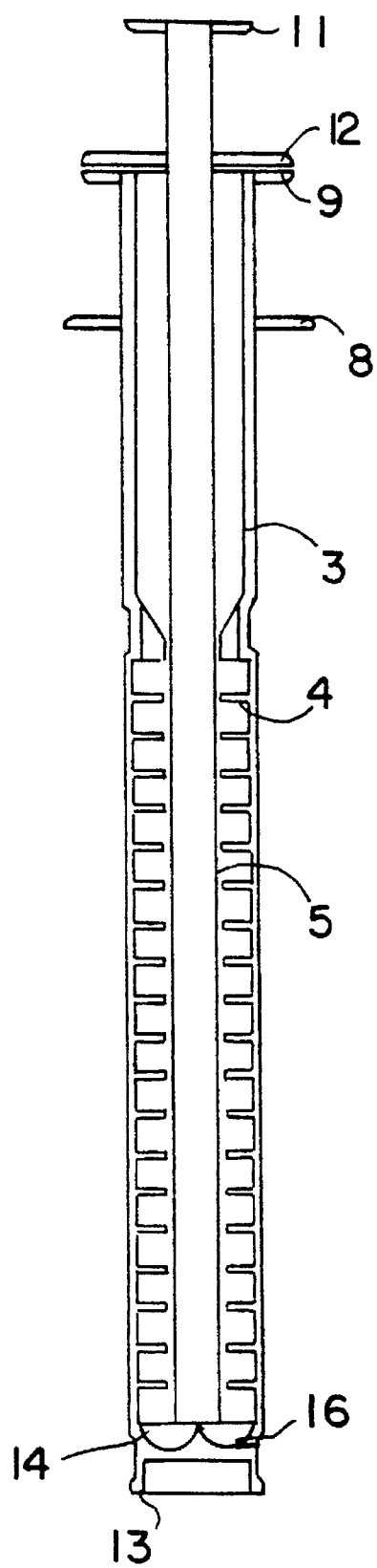
FIG. 4 shows a variant of the filter element according to the invention in longitudinal section.

In FIG. 4, the filter medium 2 is formed by a hollow member 3 and its lower part is formed by a self-supporting filtering medium $4'$. The filtering medium $4'$ itself has a bundle of tubes which is constructed in the form of six tubes around the central tube 5. The sealing cap 13 differs from that shown in FIG. 3 in that the residual liquid can run off via a bore hole 16. The sealing cap 13 differs from that shown in FIG. 3 in that it is longer and is provided with a groove 17 for receiving and fastening a filtering medium.

In operation a suspension to be filtered is pumped into the pressure vessel 1 by a pump, not shown, during a filtration cycle. The occurring solids are deposited on the filtering medium 4, while a filtrate flows via the sealing cap 13 through the opening of the central tube 5 and exits the pressure vessel 1 via the collecting tube 7. After filtration, the central tube 5 can be separated from the collecting tube 7 by loosening the screw connection at the flange 11. After separating the two flanges 12 and 9, the central tube 5 may be removed from the hollow member 3 and cleaned, while the inner side of the hollow member can be cleaned separately. The cleaned central tube 5 is mounted simply by inserting it into the hollow body 3. Known quick-closing devices can also be used instead of the flange.

A particular advantage of the filter according to the invention consists in that the filter element 2 can be disassembled without opening the pressure vessel 1. The filter element can be taken apart in such a way that the central tube and the actual filtering medium can be cleaned separately.

It will be understood that each of the elements described above, or two or more together, may also find a useful application in other types of constructions differing from the types described above.

While the invention has been illustrated and described as embodiment in a sterile-filtration filter for suspensions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A filter for sterile filtration of suspensions, comprising a pressure vessel; at least one candle filter element arranged to extend through a surface of said pressure vessel, said at least one filter element having a hollow member with a lower portion which is formed as a filtering medium and an upper portion which is formed as a closed tube with a self-supporting filtering medium; and a tube for carrying off a filtrate, said tube being formed as a central tube which is arranged in said hollow member and said filtering medium and extends through said pressure vessel so as to be removable and to permit inspection and cleaning of said filter element without opening said pressure vessel.

2. A filter as defined in claim 1, wherein said filter element has a flange provided in an upper third of said hollow member.

3. A filter as defined in claim 2, wherein said filter element has a further flange at an end at a distance from said first mentioned flange.

4. A filter as defined in claim 1, wherein said hollow member has a free end; and further comprising a sealing cap which closes said free end of said hollow member.

5. A filter as defined in claim 1; and further comprising at least one additional candle-shaped filter element formed identical with said first mentioned filter-shaped candle element.

6. A filter for sterile filtration of suspensions, comprising a pressure vessel; at least one candle filter element arranged in said pressure vessel, said at least one filter element having a hollow member with a self-supporting filtering member; and a tube for carrying off a flitrate, said tube being formed as a central tube which is arranged in said hollow member and said filtering medium and is removable so as to permit inspection and cleaning of said filter element without opening said pressure vessel, said hollow member has a free end and further comprising a sealing cap which closes said free end of said hollow member, said sealing cap being provided with a rounded bore for deflecting a liquid and facilitating back blowing and back rinsing as well as cleaning and sterilization of said sealing cap by eliminating dead corners.

7. A filter for sterile filtration of suspensions, comprising a pressure vessel; at least one candle filter element arranged in said pressure vessel, said at least one filter element having a hollow member with a self-supporting filtering medium; and a tube for carrying off a filtrate, said tube being formed as a central tube which is arranged in said hollow member and said filtering medium and is removable so as to permit inspection and cleaning of said filter element without opening said pressure vessel, said hollow member has a free end and further comprising a sealing cap which closes said free end of said hollow member, said sealing cap being provided with a condensate outlet.

8. A filter for sterile filtration of suspensions, comprising a pressure vessel; at least one candle filter element arranged in said pressure vessel, said at least one filter element having a hollow member with a self-supporting filtering medium; and a tube for carrying off a filtrate, said tube being formed as a central tube which is arranged in said hollow member and said filtering member and is removable so as to permit inspection and cleaning of said filter element without opening said pressure vessel, said hollow member has a free end and further comprising a sealing cap which closes said free end of said hollow member, said sealing cap being provided with a groove for receiving said fastening said filtering medium.

9. A filter for sterile filtration of suspensions, comprising a pressure vessel; at least one candle filter element arranged in said pressure vessel, said at least one filter element having a hollow member with a self-supporting filtering medium; and a tube which arranged in said hollow member and said filtering medium and is removable so as to permit inspection and cleaning of said filter element without opening said pressure vessel, said hollow member has a free end and further comprising a sealing cap which closes said free end of said hollow member, said sealing cap being provided with a bore hole for running off a residual liquid.

\* \* \* \* \*